United States Patent [19]
Key

[11] 3,866,487
[45] Feb. 18, 1975

[54] PULLEY DRIVE SYSTEM
[75] Inventor: Grahame Russell Key, Aylesbury, England
[73] Assignee: The Hoover Company, North Canton, Ohio
[22] Filed: Apr. 6, 1973
[21] Appl. No.: 348,765

[30] Foreign Application Priority Data
May 1, 1972    Great Britain.................... 20170/72

[52] U.S. Cl.......................................... 74/230.17 E
[51] Int. Cl........................................... F16h 55/22
[58] Field of Search .............................. 74/230.17 E

[56] References Cited
UNITED STATES PATENTS
2,678,566    5/1954    Oehrli ........................ 74/230.17 E

*Primary Examiner*—Leonard H. Gerin

[57] ABSTRACT
In the preferred form, the present invention relates to a pulley drive system which comprises a drive pulley assembly mounted on a drive shaft and a driven pulley assembly mounted on a driven shaft, each pulley assembly being of V-shape in axial cross section, and a V-belt extending between the two pulley assemblies. Each pulley assembly is formed in two half-pulleys. In the driven pulley the first half-pulley is secured to the driven shaft and a second half-pulley is axially biased away from the first half-pulley to an idling position. The second half-pulley has a hub which affords a peripheral cylindrical surface of a length capable of receiving the width of the belt so that in the idling position the second half-pulley maintains the belt out of contact with the first half-pulley. The second half-pulley incorporates a centrifugal mechanism which on rotation above a predetermined speed causes the second half-pulley to be urged toward the first half-pulley to an operative position in which the belt engages the first half-pulley to drive it. Increases in speed of the second half-pulley beyond the predetermined speed causes further movement of the second half-pulley and consequent radial outward movement of the belt on the combined parts of the driven pulley.

7 Claims, 7 Drawing Figures

PULLEY DRIVE SYSTEM

BACKGROUND OF THE INVENTION

1. Field of the Invention

The present invention relates to a pulley drive system which is centrifugally clutched and furthermore may act as a centrifugally governed variable speed drive, the same centrifugal mechanism being utilized for both clutching and varying the pulley drive ratios. The centrifugal mechanism is located on the driven pulley and is driven through the belt.

2. Description of the Prior Art

Variable speed pulley drive systems and centrifugally governed clutches for pulleys are well known in the prior art. It is also known in the prior art to utilize the same centrifugal mechanism in a pulley drive system to operate a clutch and provide variable drive ratios. This art, however, teaches devices which are located on the power input shaft and are not located on a driven shaft due to the nature of the clutch involved. Therefore, the drive ratio between the drive shaft and the driven shaft is increased rather than decreased upon an increase in speed of the drive input.

SUMMARY OF THE INVENTION

The present invention is directed to a pulley drive arrangement such that when the belt is driven at a speed which causes a centrifugal mechanism to rotate at a speed below a predetermined speed, the belt will remain on a driven pulley hub and thus the belt drive ratio will be constant to an idling half-pulley. However, when the speed of the belt increases which rotates the centrifugal mechanism at a speed above the predetermined speed, the combined parts of a driven pulley will be driven. In addition, radial outward movement of the belt will increase the effective diameter of the driven pulley, thus causing the belt drive ratio to decrease. Thus, as the speed of the drive shaft increases, the speed of the driven pulley will not increase to such an extent.

Such an arrangement is particularly useful in cases where the speed of a driven shaft needs to be governed to a narrow speed range irrespective of a wide speed range of the driving shaft. It also is useful in a drive where an unloaded condition is preferred below a predetermined speed.

The system may be such that the radial outward movement of the belt on the second pulley causes radial inward movement of the belt on the first pulley. The centrifugal mechanism may include one or more balls which are arranged to move radially outward against a biasing force, the distance moved by the second half-pulley of the driven pulley being dependent on the radial distance moved by the ball or balls. The balls may be situated within grooves formed in the second half-pulley of the driven pulley and the balls may be retained in the grooves by a retainer overlying and connected to the half-pulley. The bias on the balls may be provided by a spring which connects the retainer and the half-pulley, the half-pulley being conveniently axially located upon and rotatable upon the driven shaft.

The first half-pulley of the driven pulley may have a recess to receive at least a part of the hub as the second half-pulley moves toward the first half-pulley. The cylindrical surface of the hub ensures that when the second pulley is in an inoperative position, the belt drive ratio remains constant.

According to another aspect of the present invention, a washing machine assembly comprises a rotary drum for clothes which is adapted to be driven at at least two different speeds for washing and centrifugal extraction respectively, a pump for removing liquid from a liquid container surrounding the drum, and a drive system for the drum and pump. The drive system comprises a variable speed electric motor connected by a first drive train to the drum and by a second drive train to the pump. The second drive train incorporates a motor driven drive shaft carrying a drive pulley and a driven pump shaft carrying a driven pulley, the pulleys being interconnected by a belt, the driven pulley being formed of two half-pulleys which are axially biased away from one another to an inoperative position in which the belt does not drive the pump. One half-pulley is continuously driven by the motor and incorporates a centrifugal mechanism which, above a predetermined speed, causes that half-pulley to be urged towards the other half-pulley to cause the belt to drive the pump.

The pulleys may each be of V-shape in axial cross section and the belt may be a V-belt. Thus, as the half-pulleys move closer together, the effective diameter of the pulley will increase since the belt moves radially outwardly. During liquid extraction, when the electric motor will be accelerating the clothes drum at a high speed, the pump speed will not increase proportionately. The pump speed never, therefore, exceeds a safe level.

BRIEF DESCRIPTION OF THE DRAWING

The invention may be carried into practice in various ways but one embodiment will now be described by way of example with reference to the accompanying drawing, in which.

DESCRIPTION OF THE PREFERRED EMBODIMENT

Figure 1:
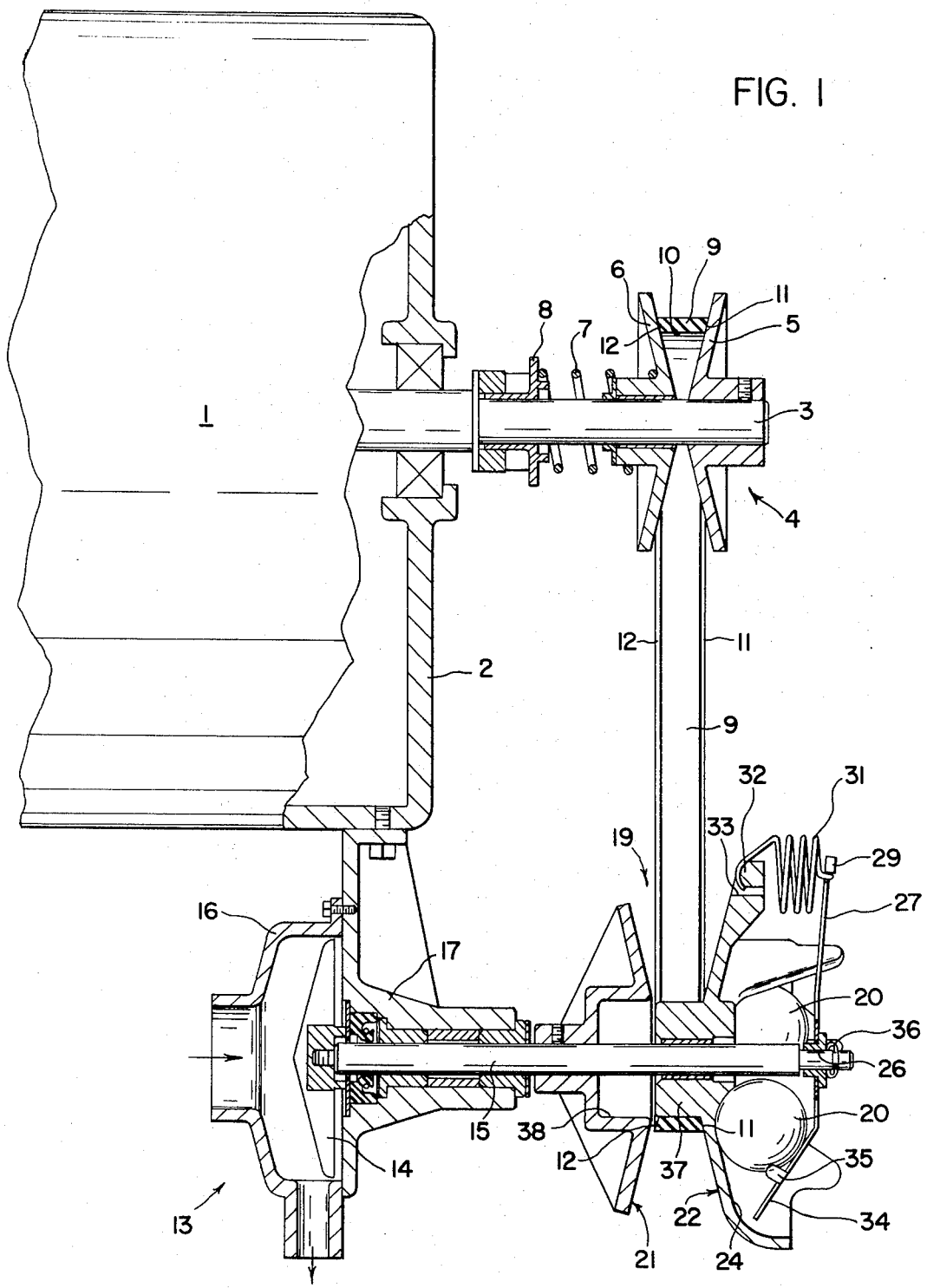
FIG. 1 is a fragmentary elevational view, partly in section, of a pulley drive system for use in a washing machine with the belt position when the motor is driving at a low speed.

FIG. 1 shows a part of a main wash motor 1 for a washing machine, the motor having a casing 2. A drive shaft 3 driven by the motor passes through the casing 2 and carries a drive pulley assembly 4 which is of V-shape in axial cross section. The pulley assembly 4 comprises two separate half-pulleys 5 and 6, one half-pulley 5 being rigidly keyed to the shaft 3, while the half-pulley 6 is slidable axially on the shaft but is biased toward the fixed half-pulley 5 by a spring 7 situated between the half-pulley 6 and a stop 8 rigid with the shaft. Rotation of the shaft 3 causes the pulley 4 to rotate and drive a V-belt 9, i.e., a belt whose side faces 11 and 12 are inclined toward the inner surface 10 of the belt.

A pump 13 is mounted directly on the motor casing 2 and comprises an impeller 14 mounted on a driven shaft 15 and situated within a pump casing 16. The casing 16 is attached to a pump back plate 17 which is mounted on the motor casing 2. The driven shaft 15 is rotatably mounted in the back plate 17 and carries a driven pulley 19 which is also V-shaped in axial cross section. The driven pulley assembly 19 is formed from two separate half-pulleys 21 and 22, the half-pulley 21 being fixed to the driven shaft 15.

Figure 4:
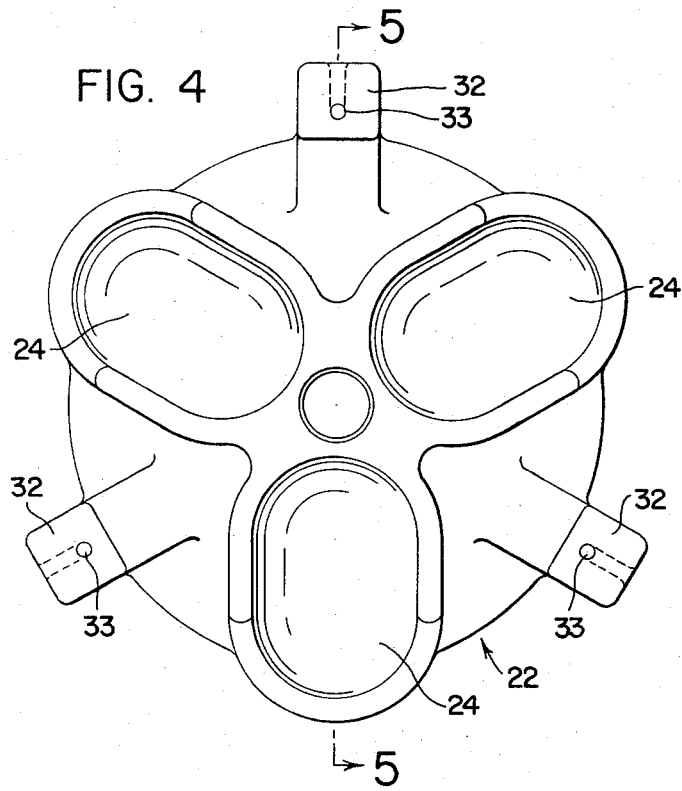
FIG. 4 is a plan view of a ball groove member of a centrifugal mechanism forming part of the pulley drive system.
Figure 5:
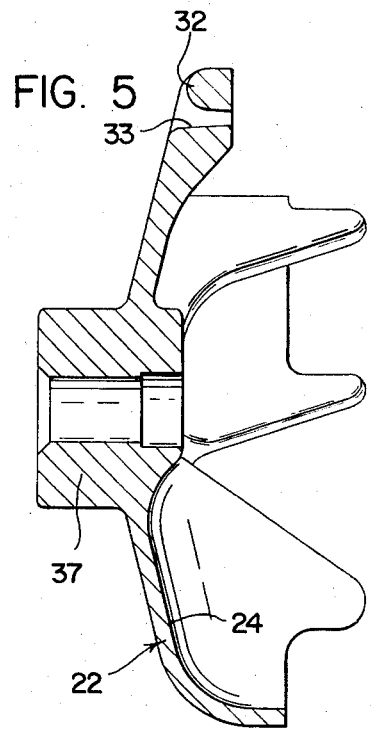
FIG. 5 is a section on the line 5—5 of FIG. 4.
Figure 6:
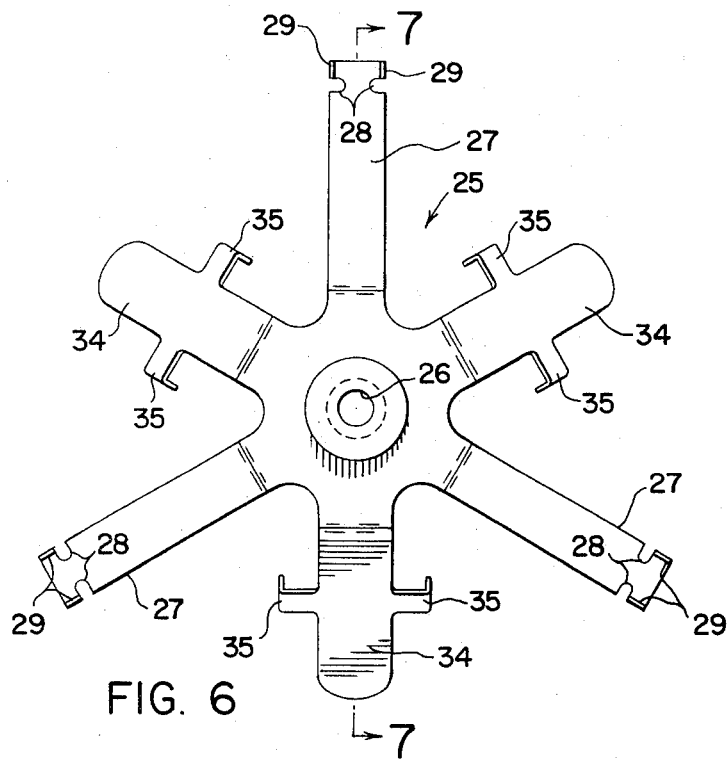
FIG. 6 is a plan view of a ball retainer of the centrifugal mechanism.
Figure 7:
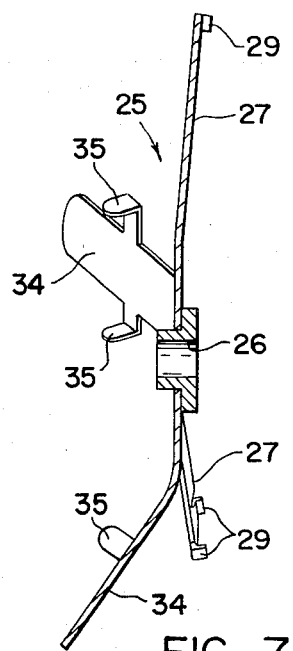
FIG. 7 is a section on the line 7—7 of FIG. 6.

The other half-pulley 22 of the driven pulley assembly 19 includes a centrifugal mechanism and is free to rotate on the driven shaft 15 and also to slide axially of the driven shaft 15. The half-pulley 22 is shown in detail in FIGS. 4 and 5 and has three outwardly sloping radial grooves 24 which are arranged to extend outwardly in a direction away from the half-pulley 21. As can be seen from FIG. 1, a ball 20 is situated in each radial groove 24 and is held in place in the respective groove by a retaining member 25 shown in detail in FIGS. 6 and 7. The retaining member 25 has a central hole 26 so that it can be rotatably mounted on the driven shaft 15. The ball retaining member also has three projections 27 which each extend substantially at right angles to the driven shaft 15 and have recesses 28 and projections 29 at their ends. These recesses 28 and projections 29 are used to attach three springs 31 between the retaining member 25 and the half-pulley 22. The half-pulley 22 has three projections 32 which contain grooves 33 for retaining the ends of the springs 31 as can be seen from FIG. 1.

The retaining member 25 has three retaining projections 34 which extend radially from the driven shaft 15, but which are inclined toward the half-pulley 22 at their ends. These projections overlie the radial grooves 24 and assist in retaining the balls 20. Each projection has an angled flange 35 on opposite sides. The retaining member 25 is fixed axially of the driven shaft 15 by a slip 36 but can rotate upon the driven shaft 15. The projections 27 and 34 are more rigid than the springs 31 so that outward movement of balls 20 causes the springs 31 to extend.

When the motor 1 is operating at a low speed, the pulley assemblies 4 and 19 will be in the positions shown in FIG. 1 and the belt inner face 10 will ride on a substantially cylindrical hub 37 forming part of the half-pulley 22. This will cause the centrifugal mechanism to rotate and the balls 20 will tend to move radially outward in the grooves 24 due to the centrifugal force created. Since the retaining member 25 is fixed axially of the shaft, any outward movement of the balls will move the half-pulley 22 nearer the half-pulley 21. Such movement is restrained by the springs 31. Initially, therefore, rotation of the shaft 3 will not be fast enough to overcome the force of the springs 31 and, therefore, the belt face 12 will not contact the half-pulley 21 so that the pump impeller 14 will remain stationary.

Figure 2:
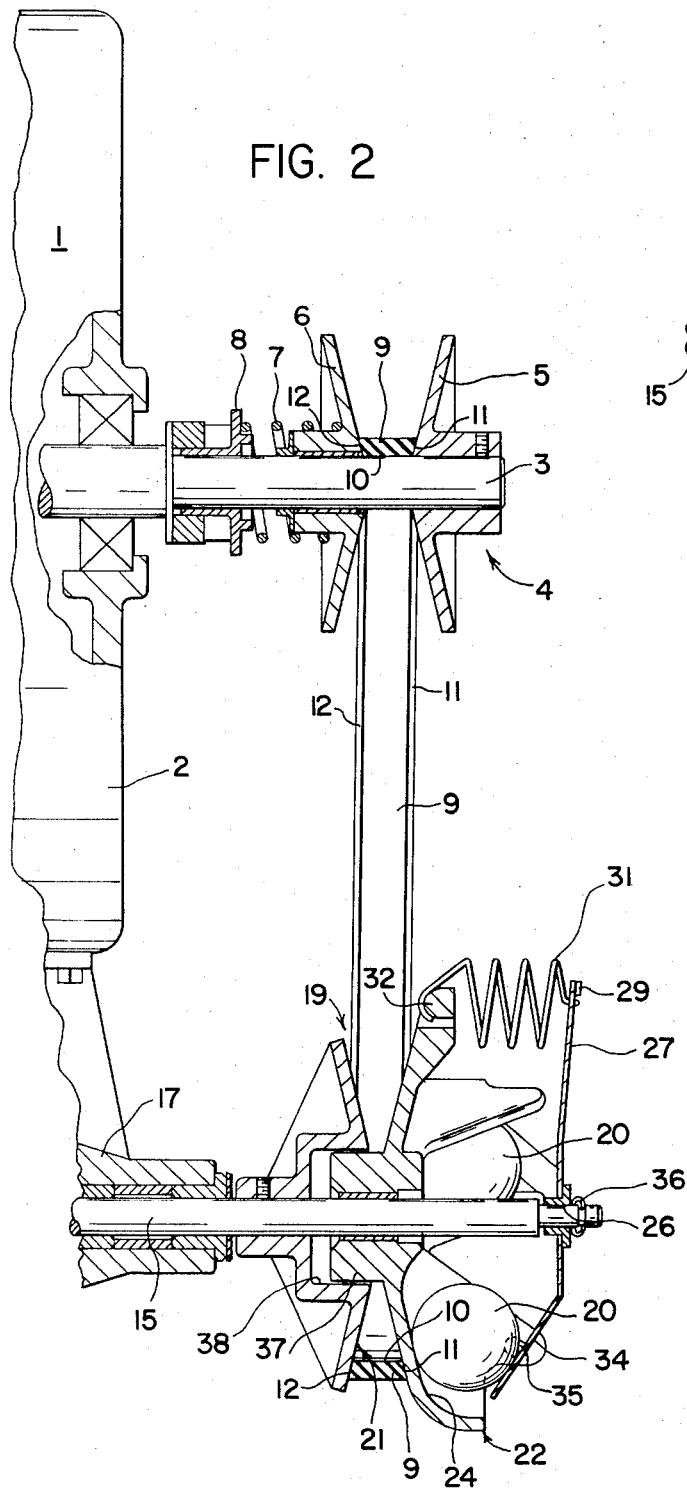
FIG. 2 is a fragmentary view similar to FIG. 1 of the pulley drive system with the belt position when the motor is driving at a high speed.

When the centrifugal mechanism is rotating at a certain predetermined speed, the radial force on the balls 20 will overcome the force of the springs 31 and the half-pulley 22 will move along the shaft 15 toward the half-pulley 21 until the hub 37 passes into a recess 38 on the fixed half-pulley 21. This position is shown in FIG. 2. When the belt face 12 engages and drives the fixed half-pulley 21 the pump impeller 14 will begin to rotate. Below this predetermined speed the belt drive ratio will be constant due to the cylindrical shape of the hub 37 and the half-pulley 22 will only idle. Above this predetermined speed the belt drive ratio will decrease since, as the pulley halves 21 and 22 are forced closer together, the belt running diameter around the driven pulley 19 will increase, while the diameter around the drive pulley 4 will decrease as the half-pulley 6 overcomes the force of the spring 7. Thus, at drive speeds above the predetermined speed, any increase in motor speed will mean that the driven speed of the pump is also increased, but only by a comparatively small amount.

A washing machine incorporating such a system will operate as follows:

During the washing part of the cycle the main wash motor 1 will rotate in alternate directions at a speed of about 850 RPM to rotate a wash drum about a horizontal axis. This will result in the half-pulley 22 and thus the centrifugal mechanism rotating at a speed of about 1500 RPM. The belt ratio at this speed is constant since the belt will be driving on the hub 37. This speed is arranged to be below the predetermined speed for the governor unit so that the half-pulley 22 will idle with the belt 9 away from half-pulley 21 and thus the pump impeller 14 will remain stationary. Thus, the machine will not pump out during washing irrespective of the direction of rotation of the wash motor.

The motor may also have an operative speed of about 1350 RPM in one direction only which is used for distributing the clothes in the wash drum prior to spinning. This will result in a rotation of the centrifugal mechanism of about 2400 RPM. If the predetermined speed of the centrifugal mechanism is set just below this value, for example 2200 RPM, the belt face 12 will be forced against the fixed half-pulley 21 and thus the pump impeller will be driven at a speed of 2400 RPM.

During spin drying the motor accelerates to about 12,500 RPM and remains at this speed for some three to four minutes. During this acceleration, the centrifugal mechanism forces the belt 9 to progressively larger running diameters on the driven pulley assembly 19 with a corresponding reduction in the running diameter on the drive pulley assembly 4. This will result in a far smaller increase in the speed of rotation of the pump. Thus, while the motor speed increases from the 1300 RPM distributing speed to the 12,500 RPM spin speed, the pump accelerates from 2400 RPM to only about 3000 RPM, thus ensuring that the pump is not overloaded at any time during the spin drying operation.

During spin acceleration, the reduction of the pump-motor speed ratio is continuous so that for any motor speed there is a stable pump speed. Due to the small acceleration of the pump and centrifugal mechanism hunting does not occur. Neither does the system hunt while the motor is spinning at top speed.

Figure 3:
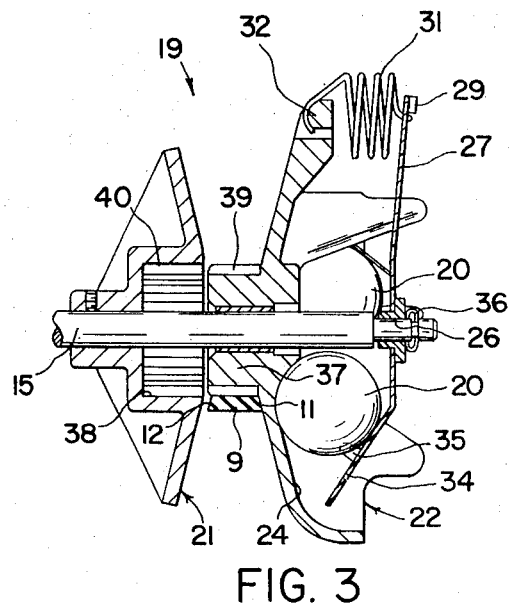
FIG. 3 is a sectional view of a modification of the driven pulley of FIGS. 1 and 2.

FIG. 3 shows a modification of the driven pulley assembly 19. It will be noted in the previous modification that the belt 9 drives on only one face. Such as seen in FIG. 1, only half-pulley 5 of the drive pulley assembly 4 is fixed to shaft 3 so that only face 11 of the belt is positively driven. If high torque is involved, greater driving force may be obtained by splining half-pulley 6 to the shaft 3 so that half-pulley 6 may move axially but not rotatably with respect to the shaft 3. Thus, both faces of the belt will be positively driven.

It is also noted in FIG. 1 that only half-pulley 21 of the driven pulley assembly 19 is fixed to the shaft 15. FIG. 3 shows a modification wherein both pulley halves of the driven pulley assembly are utilized to positively drive the driven shaft 15.

The central hub 37 of the half-pulley 22 is provided with external splines 39, these external splines being so formed to provide a substantially cylindrical hub over which the belt inner surface 10 rides when the half-pulley 22 is in the idling position prior to the motor driving at the first predetermined speed mentioned above.

The hub recess 38 of the half-pulley 21 is utilized to accept the hub 37 as the two half-pulleys are drawn together upon an increase of rotational speed. The hub recess 38 is provided with a plurality of internal splines 40 which can interengage with the external splines 39 of the hub. Thus, inward motion of the hub 22 will cause the hub external splines 39 to engage the recess internal splines 40 so that forces supplied to the half-pulley 22 through the belt face 11 will be transmitted to the shaft 15 through the half-pulley 21. Thus, there will be a positive drive through both belt faces.

The ends of the internal splines 40 may be spaced slightly inwardly into the hub recess 38. Thus, as the half-pulley 22 moves toward the half-pulley 21, belt face 12 will first engage the half-pulley 21 so as to bring the half-pulley 21 up to approximately the same rotational speed as the half-pulley 22. Now that both half-pulleys are rotated at approximately the same speed, further inward movement of the half-pulley 21 will cuase the splines 39 and 40 to interengage.

It is also understood that either of the driven pulley assemblies described above can be mounted on a stub shaft and the final drive can be applied by another belt mounted on the first half-pulley 21. In this case, half-pulley 21 need not be fixed to its support shaft.

The above structures teach preferred forms of practicing the present invention. However, other modifications may be made to the illustrated embodiments without departing from the scope of the invention. Therefore, it is intended that the appended claims include all such modifications and alternatives.

I claim:

1. A pulley drive system comprising a drive pulley assembly, a driven pulley assembly, a belt coactively connecting said pulley assemblies, said driven pulley assembly being formed of first and second half-pulleys, said half-pulleys being relatively rotatable and relatively axially movable, said first half-pulley being adapted to drive associated apparatus, a belt-receiving portion structurally integral with said second half-pulley whereby rotary motion is imparted to said second half-pulley by said belt, said belt bearing upon said belt-receiving portion and being spaced from said first half-pulley when said second half-pulley is driven below a predetermined speed so that said belt does not contact said first half-pulley, and a centrifugal mechanism associated with said second half-pulley to impart axial movement to said second half-pulley upon said belt driving said second half-pulley at a predetermined speed to bring said belt into contact with said first half-pulley to drive said first half-pulley.

2. The pulley drive system of claim 1 wherein said belt is a V-belt and said belt-receiving portion is a generally cylindrical hub of sufficient length to receive said belt.

3. The pulley drive system of claim 2 wherein said first half-pulley includes a central recess sufficient to receive at least a portion of said hub when said second half-pulley is moved axially toward said first half-pulley.

4. The pulley drive system of claim 3 wherein interengageable means are carried in part by said second half-pulley for locking said driven pulley assembly portions against relative rotational movement.

5. The pulley drive system of claim 4 wherein said interengageable means includes hub external splines upon which said belt can ride and internal splines in said recess which coact with said hub external splines when a portion of said hub is received in said recess.

6. The pulley drive system of claim 2 wherein said driven pulley assembly is generally V-shaped whereby as said driven pulley assembly is driven above said predetermined speed and further axial movement is imparted to said second half-pulley a consequent outward radial movement is imparted to said belt on said driven pulley assembly.

7. The pulley drive system of claim 6 wherein said drive pulley assembly is formed of two half-pulleys and radial outward movement of said belt on said driven pulley assembly causes radial inward movement of said belt on said drive pulley assembly.

* * * * *